Dec. 19 1922.
L. D. SOUBIER.
MEANS FOR TRANSFERRING GLASS TO MOLDS.
FILED APR. 30. 1920.
1,439,384
2 SHEETS-SHEET 1
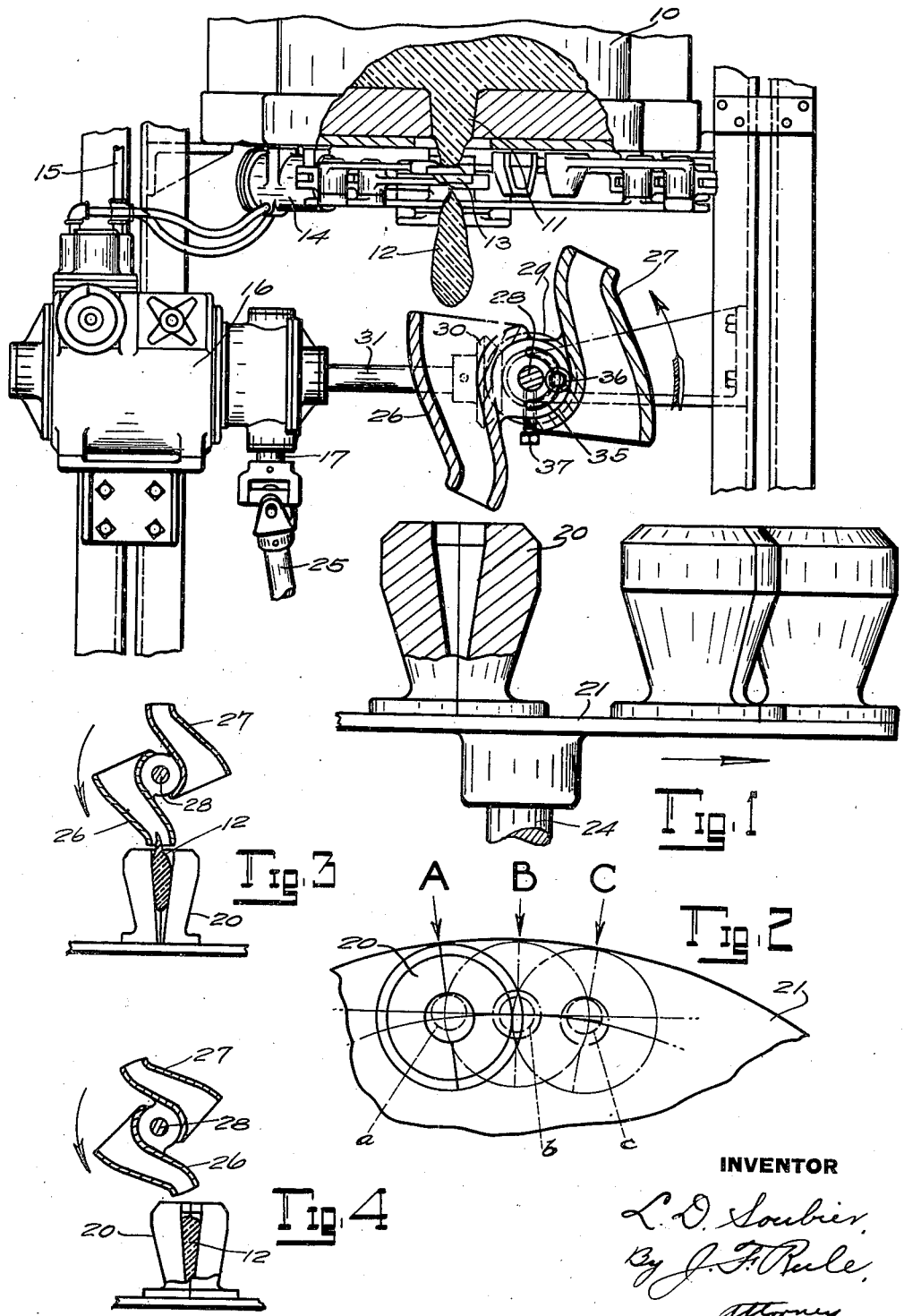
INVENTOR
L. D. Soubier,
By J. F. Rule,
Attorney.

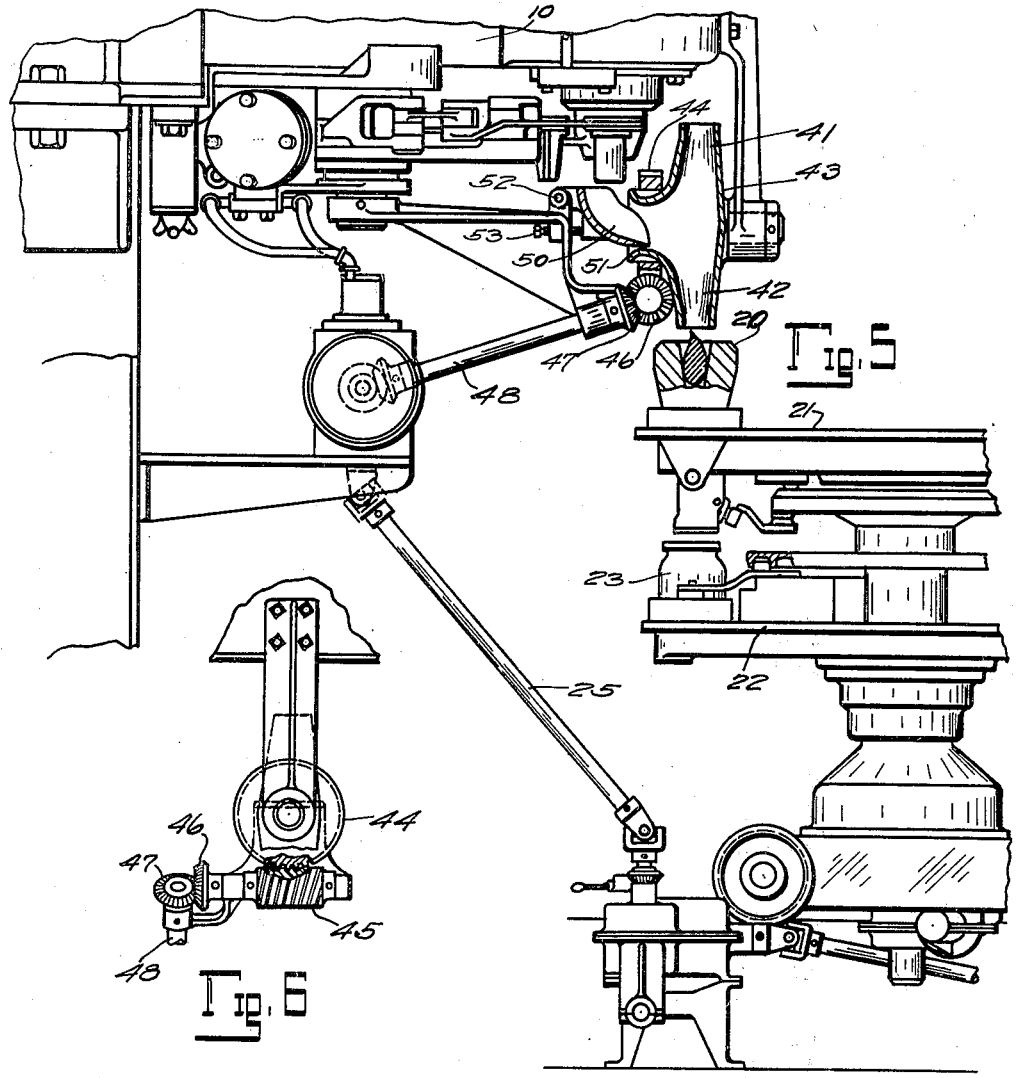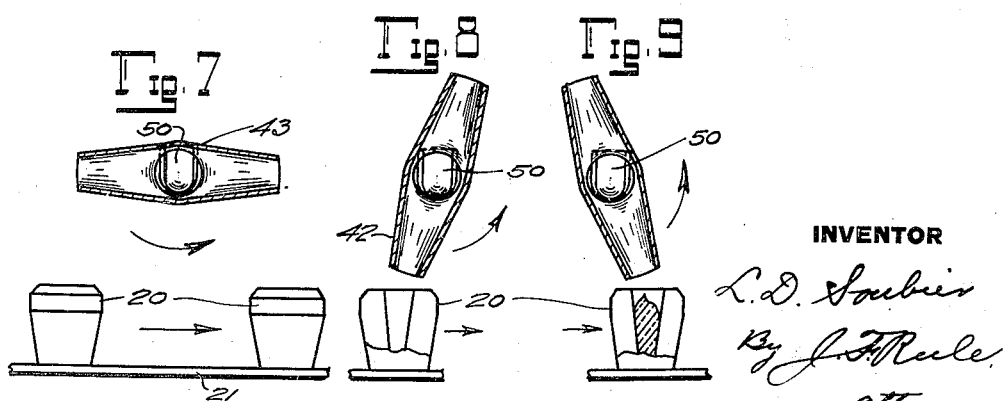

Patented Dec. 19, 1922.

1,439,384

UNITED STATES PATENT OFFICE.

LEONARD D. SOUBIER, OF TOLEDO, OHIO, ASSIGNOR TO THE OWENS BOTTLE COMPANY, OF TOLEDO, OHIO, A CORPORATION OF OHIO.

MEANS FOR TRANSFERRING GLASS TO MOLDS.

Application filed April 30, 1920. Serial No. 377,770.

*To all whom it may concern:*

Be it known that I, LEONARD D. SOUBIER, a citizen of the United States, residing at Toledo, in the county of Lucas and State of Ohio, have invented new and useful Improvements in Means for Transferring Glass to Molds, of which the following is a specification.

My invention relates to apparatus for transferring charges of molten glass to molds or other receptacles and is particularly adapted for directing and transferring the charges or gobs of glass to the molds on a continuously rotating glass forming machine.

In the accompanying drawings:

Figure 1 is a part sectional elevation of apparatus embodying the principles of my invention.

Figure 2 is a diagrammatic view indicating the advance of the guide or transfer spout in register with the traveling molds.

Figures 3 and 4 show the relation of the guide and mold at different periods.

Figure 5 is a view of the apparatus as viewed in a direction at right angles to that of Figure 1, and also shows a modified form of transfer spout.

Figure 6 is a detail view of gearing through which motion is transmitted to the spout.

Figures 7, 8 and 9 are views showing the relation of the transfer spout and mold at different periods.

The molten glass is supplied from a container 10 which may be a boot or extension of a glass melting tank. The glass flows through an outlet opening 11 in the bottom of the boot in the form of a sluggish stream or column from which mold charges or gobs 12 are periodically severed by shears 13. An air motor 14 having suitable connections for operating the cutters is operated by compressed air supplied through a pipe 15. The operation of the air motor is controlled by suitable mechanism within a casing 16 containing gearing driven by a vertical shaft 17. The specific form of mechanism for actuating the shears 13 is not illustrated in detail, as it is not a part of the present invention. Other forms of apparatus might be employed for periodically supplying gobs or charges of glass in timed relation to the movements of the molds which receive the gobs.

Parison molds 20 which receive the gobs of glass are mounted on a mold table 21 of a glass blowing machine which also includes the mold table 22 (Fig. 5) carrying finishing molds 23, said mold tables being rotatable continuously with the shaft 24 about the central vertical axis of the machine. Suitable driving connections from the blowing machine through a shaft 25, the shaft 17 and gearing already mentioned, serve to actuate the knives 13 periodically in timed relation to the movements of the molds.

In order to accurately guide the gobs into the parison molds 20 as the latter travel beneath the outlet 11, I provide a pair of funnel shaped guides 26 and 27 mounted on a continuously rotating horizontal shaft 28. These guides are oppositely disposed and so arranged that they are brought alternately into guiding position with the large end directly beneath the flow and the lower constricted end directly over or in register with the opening in a parison mold. The shaft 28 has driving connections with the shaft 17 through mitre gears 29, 30 and a horizontal shaft 31. The guides 26, 27 rotate in a counter-clockwise direction as indicated by the adjacent arrow (Fig. 1) and the molds 20 move from left to right, as indicated by the horizontal arrow, while passing beneath the guides.

With this arrangement it will be noted that the lower end of each guide moves in the same direction as the mold and the movement of the parts is so timed that each guide remains in register with a mold while the latter is traveling through a substantial arc. Thus, as diagrammatically shown in Fig. 2, the lower end of the spout 26 indicated by the broken line circle *a*, is directly over the mold opening when the mold is at the position A, corresponding to the position shown in Fig. 1. When the mold reaches the positions B and C respectively the discharge end of the spout is in the positions *b* and *c*. Figure 3 represents the parts in the position B, and Figure 4 represents them advanced to the position C. It will thus be seen that the discharge end of the spout moves with the molds and remains in register therewith for a sufficient length of time to accurately guide the gob 12 into the mold. It will also be noted that the upper end of the guide, owing to its width and proximity to its axis of rotation, remains beneath the flow opening while the spout is in register with the mold.

By providing oppositely disposed spouts 26 and 27 a slower movement of the spouts is permitted and they may remain in register with the molds for a longer period than would be practical with a single spout, also the provision of a plurality of spouts prevents overheating and sticking of the glass which might otherwise occur. The spouts are provided with overlapping lugs or flanges, one of which is formed with an arc shaped slot 35, and the other carries a clamping bolt 36 extending through the slot and permitting relative adjustment of the guides about the shaft 28. The two guides may also be adjusted as a unit around said shaft and locked in adjusted position by a locking bolt 37. The outer end of each spout or guide is curved outwardly, as shown, so that the discharge end of the spout is substantially normal to the axis about which it rotates. In other words, the glass as it leaves the spout is moving in a direction radial to the shaft 28.

Figures 5 to 9 illustrate a construction involving a modified form of guide. In this construction the oppositely disposed spouts or guides 41 and 42 are formed in a single piece comprising a rotary guiding member 43. The part 43 carries a worm wheel 44 running in mesh with a worm 45 on a horizontal shaft to which is attached a bevel gear 46 in mesh with a gear 47 on a shaft 48 corresponding to the shaft 31 of Figure 1.

A stationary deflector or guide 50 (Fig. 5) is located directly beneath the furnace outlet and is shaped to deflect the gobs and direct them through the neck 51 of the guiding member 43. The deflector 50 is mounted for adjustment about a pivot 52, a set screw 53 being provided to hold the deflector in its adjusted position. It will be noted that the guide 43 is always in position to receive a gob.

By reference to Figures 8 and 9, it will be observed that the discharge end of the spout 42 travels in register with the mold 20 from the Figure 8 position to the Figure 9 position, which two positions correspond with the positions A and C respectively of Figure 2. While the mold that has just been charged is moving away from the guide and the succeeding mold is moving toward charging position, the guide member 43 is in a horizontal or approximately horizontal position, as shown in Figure 7, so that it will receive and hold any charge of glass which may be delivered thereto out of timed relation to the movements of the molds. After the glass is introduced into the mold it is treated in a manner understood by those skilled in the art, to produce the finished articles.

Modifications may be resorted to within the spirit and scope of my invention.

What I claim is:

1. The combination with means for forming charges of molten or plastic glass, of traveling molds, and guides rotatable about a horizontal axis and each arranged to be brought periodically into a position in which it extends downwardly from said axis with its lower end in register with a mold while the upper end is above and at one side of said axis, to guide a charge of glass into the mold while the latter is traveling, the movement of each guide being synchronized with that of the mold whereby the guide and mold are retained in register during their travel through a considerable distance.

2. The combination with means for supplying charges of molten glass, of a traveling mold, a guide having open ends for receiving and discharging the glass, and means to rotate the guide about a horizontal axis and cause its lower or discharging end to remain in register with the mold and its receiving end in charge receiving position while the discharging end travels a substantial distance.

3. The combination of means for forming and dropping charges of molten glass, an annular series of molds traveling continuously in a horizontal path and brought successively beneath the point from which the gobs are dropped, and guides rotatable about a horizontal axis and thereby brought into position to guide the falling gobs into the molds while the latter are passing beneath said point, each guide when in said position having its receiving end at one side of said axis and its discharging end beneath said axis.

4. The combination with means for forming and dropping charges of molten glass, of a guide rotatable about a horizontal axis and brought periodically into guiding position beneath the point of gob discharge, the lower end of said guide being movable laterally through a considerable angle while the upper end of the guide remains above and at one side of said axis in glass receiving position beneath the point of discharge.

5. The combination with means for forming and dropping charges of molten glass, of a guide rotatable about a horizontal axis and brought periodically into guiding position beneath the point of gob discharge, the lower end of said guide being movable laterally through a considerable angle while the upper end of the guide remains above and at one side of said axis in glass receiving position beneath the point of discharge, said guide being tapered or funnel shaped, with its receiving end of larger diameter and nearer to the axis of rotation than the discharge end.

6. Means for guiding charges of molten glass, comprising in combination a funnel shaped guide open at its ends to receive and discharge the glass, and a horizontally rotating shaft with which the guide is connected to rotate, the larger end of said guide being comparatively close to the shaft and located laterally thereof while in charge receiving position, the discharge end being at a greater distance from the shaft and arranged to pass directly beneath the shaft while the receiving end is in said charge receiving position.

7. Means for guiding charges of molten glass, comprising a funnel-shaped guide, and a horizontal rotating shaft with which the guide is connected to rotate, the guide when in operative position being arranged with its upper receiving end laterally of, close to and above said shaft and its discharge end at a greater distance from the shaft and extending in a direction substantially radial to the shaft.

8. Means for guiding charges of molten glass, comprising a horizontal shaft, means to rotate it, and a pair of oppositely disposed guiding spouts each having its receiving end near the axis of rotation and its discharge end at a greater distance from said axis, said spouts so arranged that when one is in guiding position said receiving ends are located laterally at opposite sides of the axis, the discharge end of the operative spout being beneath said axis.

9. The combination with a series of horizontally traveling molds arranged to move successively past a charge receiving position, and a guide rotatable about a horizontal axis perpendicular to the direction of movement of the mold past the charging station and so arranged that the discharge end of the guide will travel in register with the mold while passing the charging station, while the receiving end of the guide is above and at one side of said axis.

10. The combination with means for forming charges of molten or plastic glass, of continuously rotating molds, and a guide rotatable about a horizontal axis, said guide having its ends at opposite sides of said axis and arranged to discharge charges of glass radial to said axis.

Signed at Toledo, in the county of Lucas and State of Ohio, this 28th day of April, 1920.

LEONARD D. SOUBIER.